Patented July 9, 1935

2,007,582

UNITED STATES PATENT OFFICE 2,007,582

MERCURY DERIVATIVES OF GALLEIN AND COERULEIN

Bernard Nelson, New York, N. Y.

No Drawing. Application December 19, 1932,
Serial No. 647,963

6 Claims. (Cl. 260—13)

This invention relates to a novel chemical compound having antiseptic properties and to antiseptic compositions made therefrom. More particularly, the invention relates to mercurated gallein and coerulein, and to antiseptic compositions including said substances.

It is an object of my invention to provide novel compounds which are particularly desirable for use as antiseptics, although such compounds may be applied to other purposes. Another object of my invention is to provide a novel antiseptic composition which may be used to advantage to replace and/or supplement existing antiseptic materials, and which may be made synthetically at reasonable cost by the method of my invention.

In order more fully to explain the invention, I will describe in detail certain examples of how the invention may be practiced. It is to be understood, however, that these examples are given only for purposes of illustration, and that the invention is not restricted to the precise conditions specified, nor to the particular materials used in these examples.

Example 1.—19 cc. of glacial acetic acid are added to a solution of 34.6 grams of coerulein in 150 cc. of twice normal sodium hydroxide solution in water. These may be mixed, for example, in a one-liter open flask, preferably with constant stirring, or other agitation. A colloidal precipitate of coerulein is formed.

Thirty-two grams of mercuric acetate dissolved in a solution of 13 cc. of glacial acetic acid in 50 cc. of water are added to the above mixture containing coerulein in suspension, after which 250 cc. of water are poured in. The mixture is then boiled, preferably in a reflux condenser at approximately atmospheric pressure for a predetermined time, after which it is cooled, and the precipitate separated by filtering and washing with cold water. The precipitate may then be dried at a predetermined temperature. The length of time during which the mixture is boiled and the temperature at which the precipitate is dried may be varied as required to produce the best results. In one method of procedure followed by applicant the mixture has been boiled for eight hours. After the precipitate has been separated by filtering and washing it has been dried at a temperature of about 105° C.

The precipitate in this case consists of hydroxy-mercury-coerulein. When dried, it is in the form of a dark brown powder which is almost wholly insoluble in water, and in the ordinary organic solvents. It has considerable solubility in aqueous sodium hydroxide solutions and in aqueous potassium hydroxide solutions, giving deep green solutions in both cases. If the alkaline solutions of hydroxy-mercury-coerulein are boiled at atmospheric pressure, they suffer alteration.

The hydroxy-mercury-coerulein can be used either in powder form or in the form of solution in dilute alkali. These products are powerful antiseptics and germicides, and can be applied preferably in the form of dilute solutions, to open cuts or abrasions in the skin, or in other ways for therapeutic or antiseptic uses.

Example 2.—25 cc. of glacial acetic acid are added to a solution of 36.4 grams of gallein and 200 cc. of twice normal sodium hydroxide solution in water. The mixing and formation of the colloidal suspension is substantially the same in this case as in Example 1.

32 grams of mercuric acetate dissolved in a solution of 50 cc. of water are added to the above mixture containing gallein in suspension, after which about 200 cc. of water are poured in and the mixture boiled, preferably in a reflux condenser, for a predetermined time after which the mixture may be cooled, the precipitate filtered, and washed with cold water and dried at a predetermined temperature. The time during which the mixture is boiled and the temperature at which the precipitate is dried may be varied as required to produce the best results. In one method of procedure followed by applicant, the mixture has been boiled for about seven hours. The precipitate, after being filtered and washed, has then been dried at about 105° C. All of these steps may be performed in substantially the same way as in Example 1.

The precipitated hydroxy-mercury-gallein, when dried, is a dark brown powder almost wholly insoluble in water. It has considerable solubility in aqueous sodium hydroxy solution and in aqueous potassium hydroxy solution, giving violet solutions. If the alkaline solutions of hydroxy-mercury-gallein are boiled at atmospheric pressure, they suffer alteration. These alkaline solutions, however, may be evaporated under reduced pressures at a low temperature, e. g., 20–35° C. to recover the dry salts of hydroxy-mercury-gallein with one, two, three or four equivalents of alkali.

The hydroxy-mercury-gallein can be used either in the form of free acid or its neutral or partially acid salts obtained by means of alkali metals. All these products are powerful germicides and can be applied, preferably in the form of dilute solutions, to open cuts or abrasions of the skin, or in other manner, for therapeutic or antiseptic purposes. These products, furthermore, do not stain the skin or tissues to which they are applied, which is a feature of very great importance in practical use as compared with such antiseptics as mercurochrome, iodine, etc.

The compound gallein used in the above example is a well known product obtained by heating pyrogallol with phthalic anhydride. It is commonly known as anthracene violet, and is assigned the following structural formula:

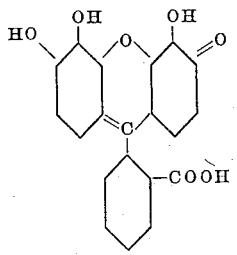

When gallein is heated with concentrated sulphuric acid, is anhydride coerulein is formed, which is commonly known as anthracene green. This is assigned the structural formula:

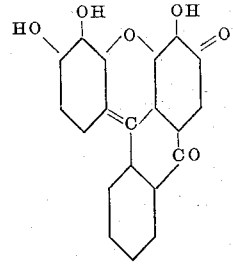

The mercury in the preferred embodiment is attached directly to a carbon atom of the aromatic rings, and does not replace or disturb any of the characteristic substitution groups already attached to the ring. Furthermore, in the preferred embodiment of the invention, the mercury forms a hydroxy-mercury group —HgOH. Although I believe the above statements regarding the structure of the novel products of my invention have been satisfactorily demonstrated, nevertheless, it is to be understood that the advantages of my invention are independent of any theory or explanation which may be made herein, and accordingly I do not intend to be bound by the correctness of these explanations and theories.

Although I have set forth above, for the purposes of explanation, two specific examples of my invention, it is to be understood that the invention is not limited thereto, but that various changes and modifications may be made in the procedure of preparing the mercurated compounds, and that numerous more or less obvious variations may be made. Thus, for example, ammonia, or an organic base, may be used instead of sodium or other inorganic base in the formation of soluble salts or analogous derivatives. Similarly, the addition of a greater or less number of mercury atoms to the molecule, the addition of alkyl groups as side chains on the aromatic rings gives valuable compounds. I have found, however, that the presence of halogen in the molecule is objectionable, particularly where the product is to be used for therapeutic purposes, and accordingly the mercuration step should be designed so as to avoid the introduction of a halogen group, and for this reason, I prefer not to use mercuric chloride in this step.

What I claim is:

1. Halogen-free mercurated compound of the group consisting of gallein and its anhydride coerulein in which HgOH is substituted for a hydrogen atom on a ring carbon, the characteristic groupings of the compound being undisturbed.

2. The substance consisting of gallein having HgOH substituted for hydrogen on a ring carbon, the characteristic groupings of the substance being undisturbed.

3. The substance consisting of coerulein having HgOH substituted for halogen on a ring carbon, the characteristic groups of the substance being undisturbed.

4. Halogen-free mercurated compound of the group consisting of gallein and coerulein in which HgOH is substituted for a hydrogen atom on a ring carbon and a radical of the group consisting of alkali metals and ammonium is substituted for a hydrogen atom attached to oxygen.

5. The substance consisting of gallein having HgOH substituted for hydrogen on a ring carbon and a radical of the group consisting of alkali metals and ammonium substituted for hydrogen attached to oxygen.

6. The substance consisting of mercurated coerulein having HgOH substituted for hydrogen on a ring carbon and a radical of the group consisting of alkali metals and ammonium substituted for hydrogen attached to oxygen.

BERNARD NELSON.